United States Patent
Lee et al.

(10) Patent No.: US 7,532,185 B2
(45) Date of Patent: May 12, 2009

(54) APPARATUS DRIVING A LIQUID CRYSTAL DISPLAY

(75) Inventors: Chang-Hun Lee, Suwon (KR); Young-Chol Yang, Kunpo (KR); Hak-Sun Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 178 days.

(21) Appl. No.: 10/514,450

(22) PCT Filed: Jul. 30, 2002

(86) PCT No.: PCT/KR02/01442

§ 371 (c)(1),
(2), (4) Date: Oct. 12, 2005

(87) PCT Pub. No.: WO2004/003641

PCT Pub. Date: Jan. 8, 2004

(65) Prior Publication Data

US 2006/0125751 A1 Jun. 15, 2006

(30) Foreign Application Priority Data

May 16, 2002 (KR) ............................... 2002-27076

(51) Int. Cl.
*G09G 3/36* (2006.01)
(52) U.S. Cl. ........................................ 345/89; 345/211
(58) Field of Classification Search .................. 345/87, 345/89, 211
See application file for complete search history.

(56) References Cited

U.S. PATENT DOCUMENTS

| 5,625,387 | A * | 4/1997 | Moon | 345/211 |
| 6,211,866 | B1 * | 4/2001 | Okutani | 345/209 |
| 6,690,344 | B1 * | 2/2004 | Takeuchi et al. | 345/85 |
| 2001/0052886 | A1 * | 12/2001 | Ikeda | 345/87 |
| 2003/0001815 | A1 * | 1/2003 | Cui | 345/102 |

FOREIGN PATENT DOCUMENTS

| JP | 08166578 | 6/1996 |
| JP | 09-090909 | 4/1997 |
| JP | 11024037 | 1/1999 |
| JP | 2000-321556 | 11/2000 |
| JP | 2001022325 | 1/2001 |
| JP | 2001-117066 | 4/2001 |
| JP | 2001281707 | 10/2001 |
| KR | 20010001458 | 1/2001 |

\* cited by examiner

*Primary Examiner*—Amr Awad
*Assistant Examiner*—Yong Sim
(74) *Attorney, Agent, or Firm*—Cantor Colburn LLP

(57) ABSTRACT

The present invention is directed to an apparatus of driving a liquid crystal display device including a plurality of pixels. The driving apparatus includes a gray voltage generator for generating a plurality of gray voltages, an image signal driver for selecting gray voltages corresponding to color signals and applying the selected gray voltages as image signal voltages to the pixels, and a signal controller for controlling the image signal driver based on the color signals and input control signals for controlling the color signals. At least two successive first gray voltages among the plurality of gray voltages are variable and at least two successive second gray voltages among the plurality of gray voltages are fixed.

23 Claims, 7 Drawing Sheets

APPARATUS DRIVING A LIQUID CRYSTAL DISPLAY

BACKGROUND OF THE INVENTION (a) Field of the Invention

The present invention relates generally to an apparatus of driving a liquid crystal display, and more particularly to a driving apparatus for a liquid crystal display for optionally adjusting white gray voltages and black gray voltages supplied to the liquid crystal display.

(b) Description of the Related Art

A liquid crystal display (LCD) is a display apparatus for obtaining desired images by applying electric field to liquid crystal material having dielectric anisotropy and injected between two panels, and adjusting the intensity of the electric field so that the amount of light passing through the panels is controlled. Such an LCD is representative of a flat panel display device handy to carry. As a kind of LCD, a TFT-LCD employing thin film transistors (TFTs) as switching devices is mainly being used.

Although most of the LCDs have used a twisted nematic (TN) mode, recently an LCD in an optically compensated bend (OCB) mode for improving a slow response time and a narrow viewing angle is briskly being studied.

The OCB mode LCD uses a bend alignment of liquid crystal molecules. However, since the bend alignment is broken under application of a voltage lower than a specific threshold voltage Vc, the OCB mode LCD can be driven by a voltage larger than the threshold voltage Vc.

However, since a voltage to transmittance (VT) curve for the OCB mode LCD is unstable, it is difficult to secure a proper driving because of serious variation of characteristics of products depending on process deviation, for example, thickness of a liquid crystal layer and alignment deviations.

In other words, in the case of a normally white mode OCB LCD, it is difficult to adjust the luminance since a significant luminance difference is generated even by a minute voltage variation due to a sharp gradient of the VT curve in a white region corresponding to low voltages. On the other hand, since the VT curve in a black region corresponding to high voltages has several inflection points, there occurs a gray inversion that the higher the voltage is, the higher the luminance is. Since such a phenomenon produces significant differences in gray characteristics even by minute process deviations of products, there occurs a problem that the luminance is different even for the same gray voltage.

SUMMARY OF THE INVENTION

In considerations of the above problems, it is a motivation of the present invention to easily adjust gray voltages according to gray characteristics.

To achieve the motivation, according to an aspect of the present invention, a apparatus of driving a liquid crystal display including a plurality of pixels includes: a gray voltage generator for generating a plurality of gray voltages; an image signal driver for selecting gray voltages corresponding to color signals and applying the selected gray voltages as image signal voltages to the pixels, and a signal controller for controlling display of the image signal driver based on the color signals and input control signals for controlling the color signals, wherein at least two successive first gray voltages among the plurality of gray voltages are variable and at least two successive second gray voltages among the plurality of gray voltages are fixed.

The first gray voltages may be varied by using a variable resistor and includes a black voltage or a white voltage.

The driving apparatus can vary at least two successive third gray voltages among the plurality of gray voltages.

Preferably, the first gray voltages include a black voltage, the third gray voltages include a white voltage, and the first gray voltages and the third gray voltages may be varied independently.

The plurality of gray voltages preferably include a plurality of pairs of gray voltages, each pair of gray voltages having opposite polarity and equal magnitude.

At least one pair among the plurality of pairs of gray voltages are preferably varied in association with each other.

The variable resistor and the signal controller are preferably mounted on a printed circuit board external to the liquid crystal display.

According to another aspect of the present invention, an apparatus of driving a liquid crystal display including a plurality of pixels includes: a gray voltage generator for generating a plurality of gray voltages; a data driver for selecting gray voltages corresponding to color signals and applying the selected gray voltages as image signal voltages to the pixels; and a signal controller for controlling the image signal driver by means of the color signals and control input signals for controlling the color signals, wherein the gray voltage generator includes a first variable resistor unit connected to the data driver and providing a first variable gray voltage, a first array of resistors connected between the first variable resistor and a first voltage and generating a plurality of second gray voltages to be provided for the data driver, and a second array of resistors having a terminal connected to the first voltage an generating a plurality of third gray voltages.

Preferably, the gray voltage generator includes a polarity inverter connected to the data driver for inverting polarity of a signal from the first variable resistor unit and providing the polarity-inverted signal to the data driver.

Preferably, the first variable resistor unit includes a variable resistor and a buffer connected between a variable terminal of the variable resistor and an input terminal of the polarity inverter and outputting the first variable gray voltage.

Preferably, the polarity inverter includes an operational amplifier having an inverting terminal connected to the buffer, a non-inverting terminal supplied with an inverting reference signal, and an output terminal, a first resistor connected between the buffer and the inverting terminal, and the second resistor connected between the inverting terminal and the output terminal.

Preferably, the gray voltage generator further includes a second variable resistor unit connected to the data driver for providing a fourth variable gray voltage, the gray voltage generator further includes a third array of resistors connected between the second variable resistor unit and a second voltage and generating a plurality of fifth gray voltages to be provided to the data driver, and the second array of resistors is connected between the first voltage and the second voltage.

Preferably, the first gray voltage may include a black voltage and the fourth variable gray voltage includes a white voltage.

Preferably, the polarity inverter and the data driver are provided on the same chip as the data driver, and the variable resistor is provided on the same chip as the signal controller.

Preferably, the liquid crystal display has an OCB mode.

DETAILED DESCRIPTION OF PREFERRED EMBODIMENT

Preferred embodiment of the present invention will now be described in detail with reference to the accompanying drawings.

Figure 1:
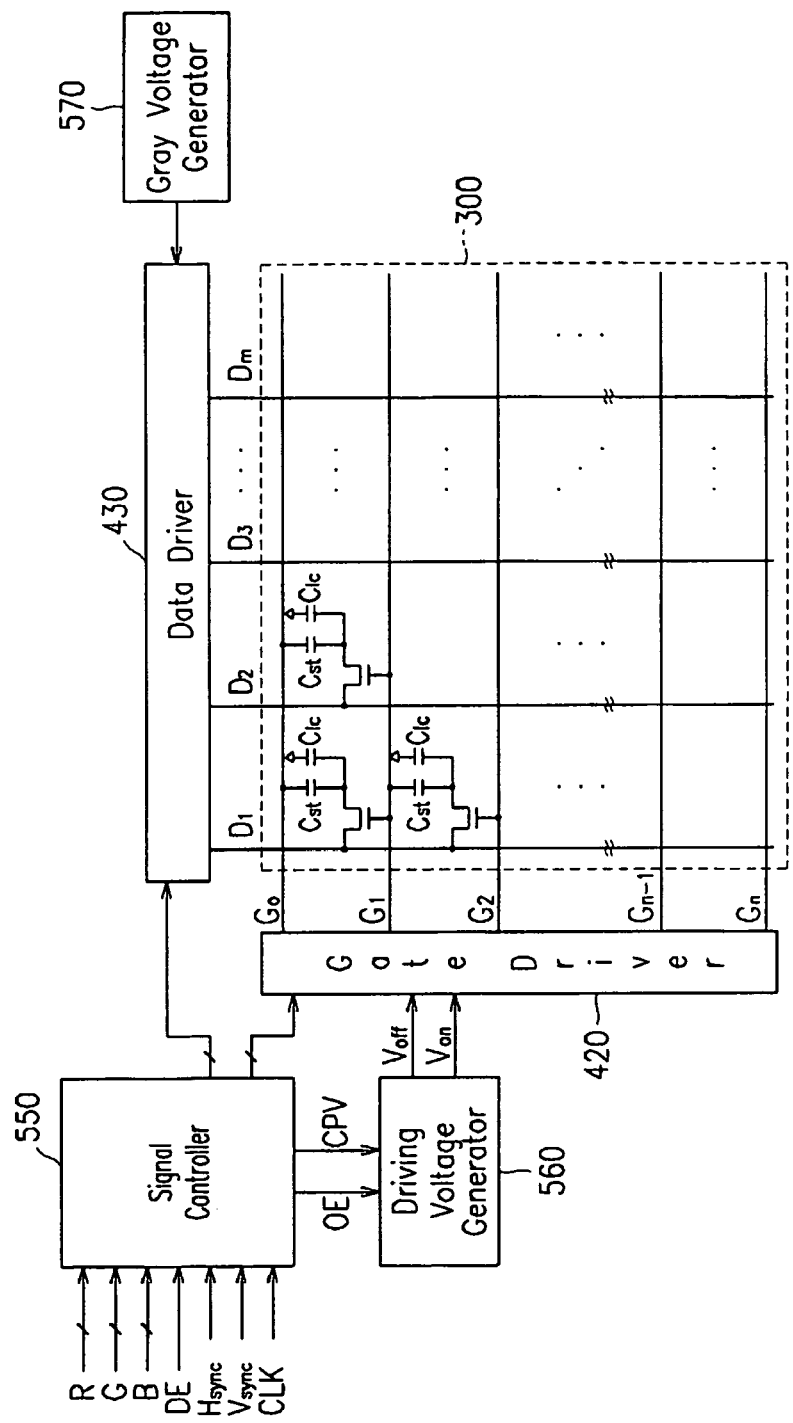
FIG. 1 is a schematic view of an LCD according to an embodiment of the present invention.
Figure 2:
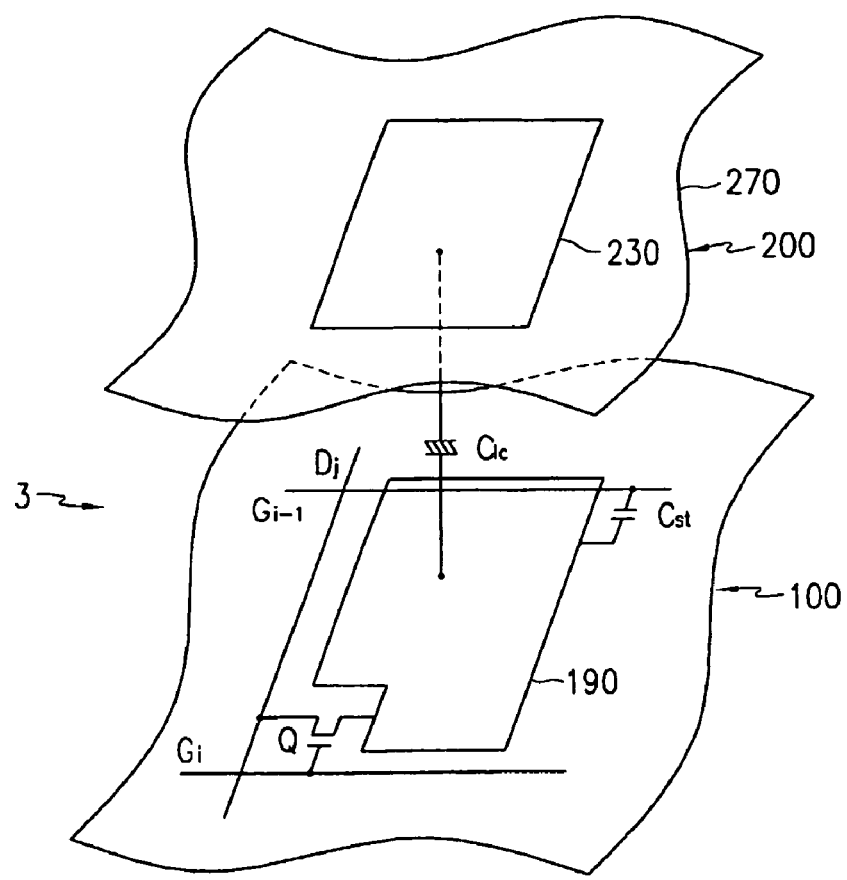
FIG. 2 is an equivalent circuit diagram of one pixel.

FIG. 1 is a schematic block diagram of an LCD according to an embodiment of the present invention, and FIG. 2 is an equivalent circuit diagram of one pixel.

Referring to FIG. 1, an LCD according to an embodiment of the present invention includes a liquid crystal panel assembly 300, a gate driver 420 and a data driver 430 connected to the panel assembly 300, a driving voltage generator 560 connected to the gate driver 420, a gray voltage generator 570 connected to the data driver 430, and a signal controller 550 for controlling these elements.

From the point of view of an equivalent circuit, the panel assembly 300 includes a plurality of signal lines $G_0$-$G_n$ and $D_1$-$D_m$ and a plurality of pixels connected thereto, and each pixel includes a switching element Q connected to corresponding ones of the signal lines $G_0$-$G_n$ and $D_1$-$D_m$, a liquid crystal capacitor $C_{lc}$ and a storage capacitor $C_{st}$ connected thereto. The signal lines $G_0$-$G_n$ and $D_1$-$D_m$ include a plurality of scanning signal lines or gate lines $G_0$-$G_n$ extending in a row direction for conveying scanning signals or gate signals and a plurality of image signal lines or data lines $D_1$-$D_m$ extending in a column direction for conveying image signals or data signals. The switching element Q has three terminals, a control terminal connected to the gate lines $G_0$-$G_n$, another connected to the data lines $D_1$-$D_m$, and the other connected to one terminal of the liquid crystal capacitor $C_{lc}$ and one terminal of the storage capacitor $C_{st}$.

The other terminal of the liquid crystal capacitor $C_{lc}$ is coupled to a common voltage $V_{com}$ or a reference voltage. The other terminal of the storage capacitor $C_{st}$ is connected to a gate line located just above (hereinafter referred to as "previous gate line") as seen from the figure. Such a connection is called as a previous gate scheme. However, the other terminal of the storage capacitor $C_{st}$ can be connected to another voltage such as the common voltage, which case is called as an independent wiring scheme.

On the other hand, a structure of the panel assembly 300 is shown in FIG. 2. For the sake of convenience, only one pixel is shown in FIG. 2.

As shown in FIG. 2, the panel assembly 300 includes a lower panel 100 and an upper panel 200 which are opposite to each other, and a liquid crystal layer 3 interposed between the two panels. The lower panel 100 includes gate lines $G_{i-1}$, a data line $D_i$, a switching element Q, and a storage capacitor $C_{st}$. The liquid crystal capacitor $C_{lc}$ has two terminals, one being a pixel electrode 190 of the lower panel 100 and the other being a common electrode 270 of the upper panel 200.

The liquid crystal layer 3 functions as a dielectric between the two electrodes 190 and 270. The liquid crystal layer 3 of this embodiment can take the OCB mode, for example, in which the liquid crystal molecules are oriented in a bend alignment such that the molecular orientations are symmetrical with respect to a mid-plane between the lower panel 100 and the upper panel 200.

The pixel electrode 190 is connected to the switching element Q, and the common electrode 270 covers the entire surface of the upper panel 200 and is connected to the common voltage $V_{com}$.

The orientations of the liquid crystal molecules are changed depending on an electric field generated by the pixel electrode 190 and the common electrode 270 and thereby, polarization of light passing through the liquid crystal layer 3 is changed. Such a change of polarization leads to a change of transmittance of light by a polarizer (not shown) attached to the panels 100 and 200.

The pixel electrode 190 overlaps the previous gate line $G_{i-1}$ with an insulator therebetween, and thereby, the pixel electrode 190 forms one terminal of the storage capacitor $C_{st}$ while the previous gate line $G_{i-1}$ forms the other terminal of the storage capacitor $C_{st}$. In case of independent wiring scheme, a separate wire supplied with a voltage such as the common voltage overlaps the pixel electrode 190 to form a storage capacitor $C_{st}$.

FIG. 2 shows a MOS transistor implemented by a thin film transistor having a channel layer formed by amorphous silicon or polycrystalline silicon in an actual process, as an example of the switching element Q.

Unlike FIG. 2, there is a case that the common electrode 270 is provided in the lower panel 100. In this case, both of the two electrodes 190 and 270 have shapes of stripes or bars.

On the other hand, in order to realize color display, each pixel represents a color, which can be accomplished by providing a red, green or blue color filter 230 in a region corresponding to the pixel electrode 190. Although the color filter 230 is typically formed in a corresponding area of the upper panel 200 as shown in FIG. 2, it also can be formed on or under the pixel electrode 190 of the lower panel 100.

Referring to FIG. 1 again, typically, the gate driver 420 and the data driver 430 also called a scan driver and a source driver, respectively, include a plurality of gate driving ICs and a plurality of data driving ICs, respectively. Each IC can be separately provided outside the panel assembly 300, mounted on the panel assembly 300, or formed on the panel assembly through the same process as the signal lines $G_0$-$G_n$ and $D_1$-$D_m$ and the thin film transistors Q.

Figure 3:
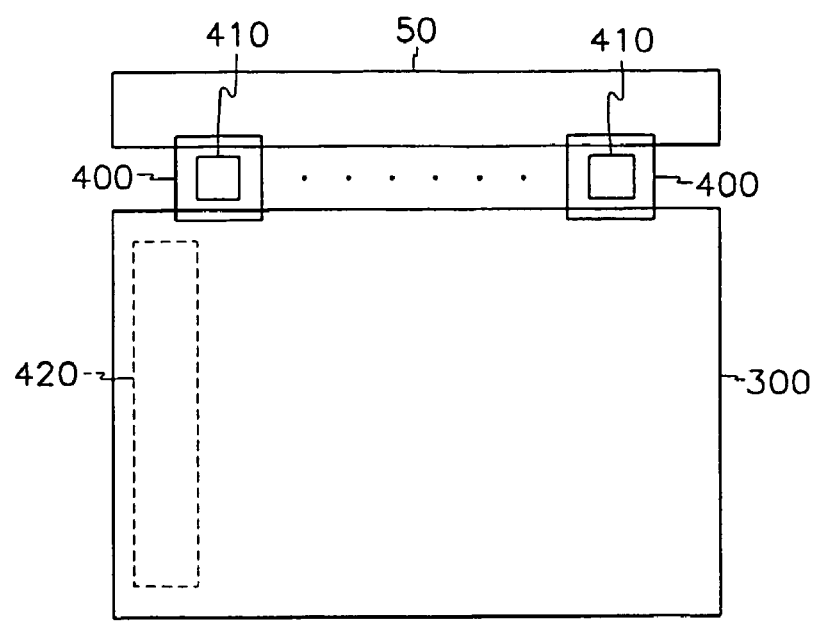
FIG. 3 is a configuration view of an LCD according to the present invention.

FIG. 3 shows a structure in which the gate driver 420 is integrated into the panel assembly 300 and the data driver 430 including a plurality of chips 410 is mounted on flexible circuit films 400.

The gate driver 420 connected to the gate lines $G_0$-$G_n$ of the panel assembly 300 applies the gate signal, which is a combination of a gate on voltage $V_{on}$ and a gate off voltage $V_{off}$ from the driving voltage generator 560, to the gate lines $G_0$-$G_n$.

The data driver 430 connected to the data lines $D_1$-$D_m$ of the panel assembly 300 selects correspondences among the gray voltages from the gray voltage generator 570 and applies the selected gray voltages, as the data signals, to the data lines $D_1$-$D_m$.

As shown in FIG. 3, the signal controller 550 and the driving voltage generator 560 are provided on a printed circuit board (PCB) 550, which is mechanically and electrically connected to the panel assembly 300 through the flexible circuit films 400. The gray voltage generator 570 according to the embodiment of the present invention can be provided in part on both the PCB 500 and the chips 410 or provided only on the PCB 500.

The operation of the gate driver 420, the data driver 430, the driving voltage generator 560, etc. are controlled by the signal controller 550 connected to them, which will be in detail described.

The signal controller 550 is supplied with RGB color signals R, G and B and input control signals, for example, a vertical synchronization signal $V_{sync}$, a horizontal synchronization signal $H_{sync}$, a main clock CLK, a data enable signal DE, etc., for controlling display of the RGB color signals R, G and B from an external graphics controller (not shown). The signal controller 550 produces gate control signals and data control signals based on the input control signals, and then, sends the gate control signals to the gate driver 420 and the driving voltage generator 560 and the data control signals and properly processed color signals R, G and B to the data driver 430.

The gate control signals include a vertical synchronization start signal STV for notifying a start of output of a gate on pulse ("high level" interval of the gate signal), a gate clock signal CPV for controlling an output time of the gate on pulse, an output enable signal OE for defining the width of the gate on pulse, etc. Among these signals, the output enable signal OE and the gate clock signal CPV are provided to the driving voltage generator 560. The data control signals include a horizontal synchronization start signal STH for notifying a start of input of color signals, a load signal LOAD or TP for instructing to apply data voltages to the corresponding data lines, a data clock signal HCLK, etc.

At that time, the signal controller 550 outputs the received color signals R, G and B based on the data enable signal DE.

Upon receipt of the vertical synchronization start signal STV, the gate driver 420 applies the gate on voltage $V_{on}$ from the driving voltage generator 560, as the gate on pulse, to the gate lines $G_0$-$G_n$ to turn on the switching elements Q connected to the gate lines $G_0$-$G_n$, in synchronization with the gate clock signal CPV. At that time, the width of the gate on pulse is determined by the output enable signal OE. During remaining time when the gate on pulse is not applied, the gate off voltage $V_{off}$ is applied to the gate lines $G_0$-$G_n$ to turn off the switching elements Q. In addition, the driving voltage generator 560 generates the common voltage $V_{com}$ and provides it to the panel assembly 300.

The data driver 430 stores the received color signals R, G and B into a shift register (not shown) upon receiving the horizontal synchronization start signal STH, and then selects gray voltages corresponding to the color signals R, G and B among the gray voltages from the gray voltage generator 570 and applies the selected gray voltages to the corresponding data lines upon receiving a pulse of the load signal LOAD, in synchronization with the data clock signal HCLK. Then, the data signals are applied to respective pixels through the activated switching elements Q connected to the corresponding data lines.

The present invention proposes two embodiments which control the gray voltages generated by the gray voltage generator 570 such that the same gray gives the same luminance.

Figure 4:
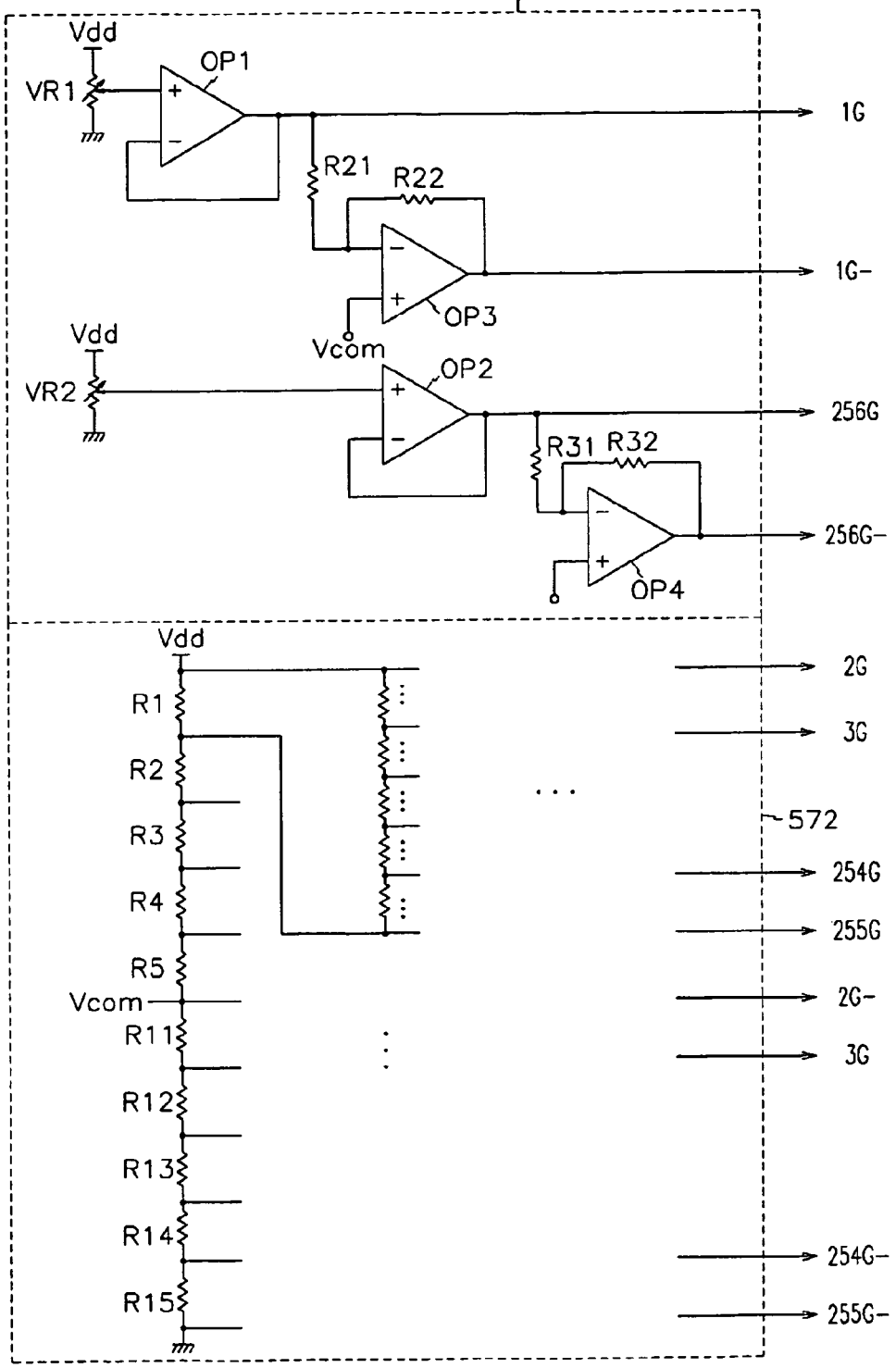
FIG. 4 is a detailed circuit diagram of a gray voltage generator according to an embodiment of the present invention.
Figure 5:
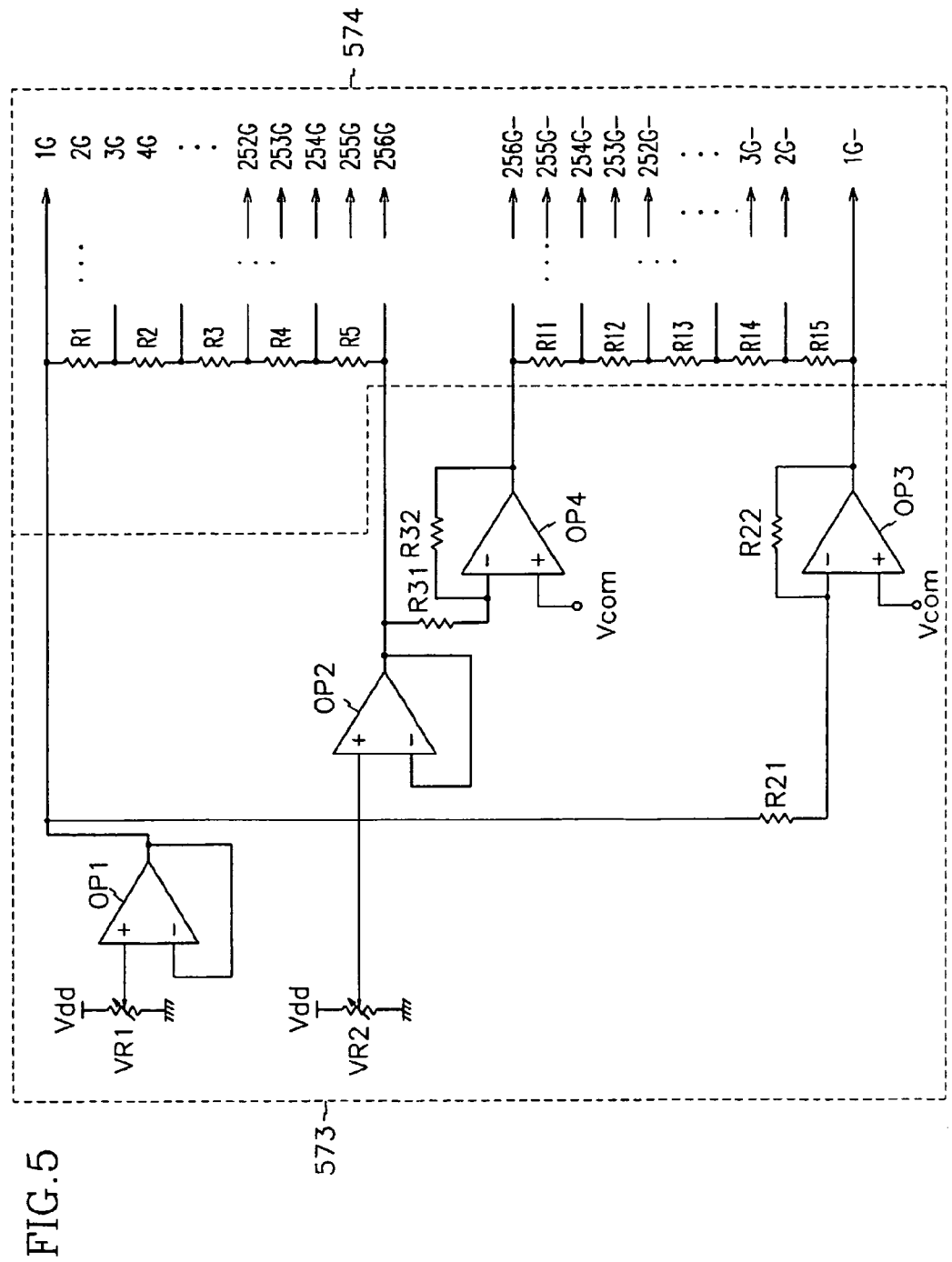
FIG. 5 is a detailed circuit diagram of a gray voltage generator according to another embodiment of the present invention.

Referring to FIGS. 4 and 5, the gray voltage generator according to embodiments of the present invention will be described in detail.

FIG. 4 is a detailed circuit diagram of an exemplary gray voltage generator according to an embodiment of the present invention.

As shown in FIG. 4, a gray voltage generator 570 according to an embodiment of the present invention includes two independent voltage output units 571 and 572 for generating the gray voltages.

A first voltage output unit 571 of the two voltage output units 571 and 572 generates voltages corresponding to the lowest gray (i.e., the black gray) and the highest gray (i.e., the white gray), which are independent from each other. In case of a normally white mode, the voltage corresponding to the black gray is the highest while the voltage corresponding to the white gray is the lowest. In the embodiment of the present invention, each of the color signals R, G and B includes 8 bits, and accordingly, the total number of possible grays is 256 (=$2^8$). The black voltage becomes a first gray voltage 1G and the white voltage becomes a 256-th gray voltage 256G, with a relationship of the first gray voltage>the 256-th gray voltage. On the other hand, since the property of the liquid crystal material may get deteriorated if an electric field is applied in only one direction to the liquid crystal material, it is necessary to apply a voltage with opposite polarity. Accordingly, the first voltage output unit 571 according to the embodiment of the present invention generates all of positive and negative black voltages 1G and 1G- and positive and negative white voltages 256G and 256G-. Here, the positive and negative polarities mean polarities with respect to the common voltage $V_{com}$. In addition, since a positive gray voltage gives the same luminance as a corresponding negative gray voltage, a difference between the positive gray voltage and the common voltage $V_{com}$ is preferably equal to that between the negative gray voltage and the common voltage $V_{com}$.

Circuits for generating the black voltages 1G and 1G- and the white voltages 256G and 256G- have substantially the same configuration in the first voltage output unit 571. The circuit for generating the black voltages 1G and 1G- includes a variable resistor VR1 and two operational amplifiers OP1 and OP3 serially connected to the variable resistor VR1 with two resistors R21 and R22.

The operational amplifier OP1 outputting the positive black voltage 1G has a non-inverting input (+)connected to the variable resistor VR1 and an inverting input (−) and an output in negative feedback.

The operational amplifier OP3 inverting the positive black voltage 1G to be output as the negative black voltage 1G- includes an inverting input (−) connected to the output of the operational amplifier OP1 through the input resistor R21 and a non-inverting input (+)connected to the common voltage $V_{com}$. In addition, the operational amplifier OP3 is in negative feedback through the feedback resistor R22 connected between the inverting input (−) and the output of the operational amplifier OP3.

The circuit for generating the white voltages 256G and 256G- includes a variable resistor VR2, two operational amplifiers OP2 and OP4, and two resistors R31 and R32. The internal connections in the circuit are configured in the same manner as the circuit for generating the black voltages 1G and 1G-, for generating the positive and negative white voltages 256G and 256G-.

The second voltage output unit 572 generates the remaining gray voltages, i.e., second to 255-th gray voltages 2G~255G and 2G-~255G-, which are not generated in the first voltage output unit 571. The configuration of the second voltage output unit 572 is shown in FIG. 4.

As shown in FIG. 4, the second voltage output unit 572 includes an array of resistors connected between a supply voltage Vdd and the common voltage $V_{com}$. The array of resistors has a hierarchical configuration that the resistors are connected in stages. More particularly, as shown in FIG. 4, a predetermined number of resistors R1~R5 in a first stage are connected in series between the power source Vdd and the common voltage $V_{com}$, and subsequently, a predetermined number of resistors in a second stage are connected in series across each resistor in the first stage, . . . , and so on. Such a connection is repeated until a proper number of gray voltages are obtained. The number of resistors in each stage can be varied as required. It is shown in FIG. 4 that the number of resistors in the first stage is five and the number of resistors in the second stage is five. The above-described array of resistors connected between the power source Vdd and the common voltage $V_{com}$ generates positive gray voltages 2G~255G. In addition, the second voltage output unit 572 includes another array of resistors connected between the common voltage $V_{com}$ and a ground for generating negative gray voltages 2G~255G-. A connection configuration of these resistors is equal to that of the resistors for generating the positive gray voltages 2G~255G.

Among the circuit components of the first and second voltage output units 571 and 572 having the above-described configuration, the variable resistors VR1 and VR2 and a plurality of voltage dividing resistors R1~R5, R1~R15, . . . can be mounted on the PCB 500, and the operational amplifiers OP1~OP4 with the resistors R21, R31, R22 and R32 can be mounted on the chips 410.

Now, the operation of the gray voltage generator 570 according to the embodiment of the present invention as described above will be described.

After an LCD is manufactured, a gray characteristic of the LCD is checked. If luminance of black and white grays is deviated from a reference value, an input voltage applied to the non-inverting inputs of the operational amplifiers OP1 and OP2 is varied by adjusting resistances of the variable resistors VR1 and VR2 of the first voltage output unit 571 mounted on the PCB 500, such that the luminance has the reference value. At that time, it is preferable that the black voltage is not lower than the second gray voltage and the white voltage is not higher than the 255-th gray voltage. The operational amplifiers OP1 and OP2, which work as buffers, output the adjusted voltages via their outputs. The output voltages of the operational amplifiers OP1 and OP2 are supplied to the data driver 430 as the positive black voltage 1G and the positive white voltage 256G, respectively, and also supplied to their own inverting inputs and the inverting inputs of the operational amplifiers OP3 and OP4.

The operational amplifiers OP3 and OP4 generate the negative black voltage 1G- and the negative white voltage 256G-, respectively, by inverting and amplifying the voltages inputted into their inverting inputs with gains defined by the resistors R21 and R22; and R31 and R32, and provide the generated voltages for the data driver 430. Here, the negative voltage means the voltage which is equal in magnitude to but different in sign from the positive voltage in view of a difference between the common voltage $V_{com}$ and each of these voltages.

On the other hand, the second gray voltage output unit 572 generates the positive and negative gray voltages 2G~255G and 2G-~255G- for indicating the remaining grays existing between the black gray and the white gray by means of a voltage dividing function of the resistors having predetermined resistances and connected in a hierarchical configuration, and provides the generated voltages to the data driver 430.

According to the embodiment as described above, the black voltages 1G and 1G- and the white voltages 256G and 256G- are adjustable, but regardless of such an adjustment, the remaining gray voltages 2G~255G and 2G-~255G- are outputted by the resistors R1 to R5 and R11 to R15 having resistances determined in accordance with a predetermined gamma curve.

Next, a configuration and operation of an exemplary gray voltage generator 570 according to another embodiment of the present invention will be described with reference to FIG. 5. Here, like reference numerals will be given to those elements for performing like function as in the embodiment shown in FIG. 4.

As shown in FIG. 5, a gray voltage generator 570 according to another embodiment of the present invention includes a voltage regulator 573 and a voltage output unit 574 connected thereto.

The voltage regulator 573 and the voltage output unit 574 of this embodiment have configurations similar to those of the first and second voltage output units 571 and 572 in the previous embodiment, respectively, except that the supply voltage Vdd, the common voltage $V_{com}$, and the ground in the second voltage output unit 572 of the previous embodiment are replaced with an output of an operational amplifier OP1, outputs of two operational amplifiers OP2 and OP4, and an output of an operational amplifier OP3, respectively, in the voltage regulator 573. Here, when the common voltage $V_{com}$ in the second voltage output unit 572 is replaced, the output of the operational amplifier OP2 is connected to an array of resistors for generating the positive gray voltages and the output of the operational amplifier OP4 is connected to an array of resistors for generating the negative gray voltages. Due to such a connection relationship, the gray voltages outputted from nodes of the resistors depend on input voltages from the operational amplifiers OP1 to OP4.

In other words, the difference between FIG. 5 and FIG. 4 is that a plurality of resistors are connected in a series between the power source, the common voltage $V_{com}$ and the ground in FIG. 4 while the plurality of resistors are connected in series between the outputs of the operational amplifiers OP1 to OP4 in FIG. 5. Therefore, further description about a connection relationship between the resistors is omitted.

The voltage regulator 573 and the voltage output unit 574 of the present embodiment can be mounted on the PCB 500.

The above-described gray voltage generator 570 of this embodiment inputs the outputs of the voltage regulator 573 to the voltage output unit 574.

The voltage output unit 574 provides the voltages from the operational amplifiers OP1 to OP4, as the positive black voltage, the positive white voltage, the negative black voltage and the negative white voltage, respectively, for the data driver 430. The remaining gray voltages are provided for the data driver 430 as proper values of voltages in accordance with a voltage dividing function of the array of resistors.

Next, a configuration and operation of an exemplary gray voltage generator 570 according to still another embodiment of the present invention will be described with reference to FIG. 6. Here, like reference numerals will be given to those elements for performing like function as in the embodiment shown in FIG. 5.

Figure 6:
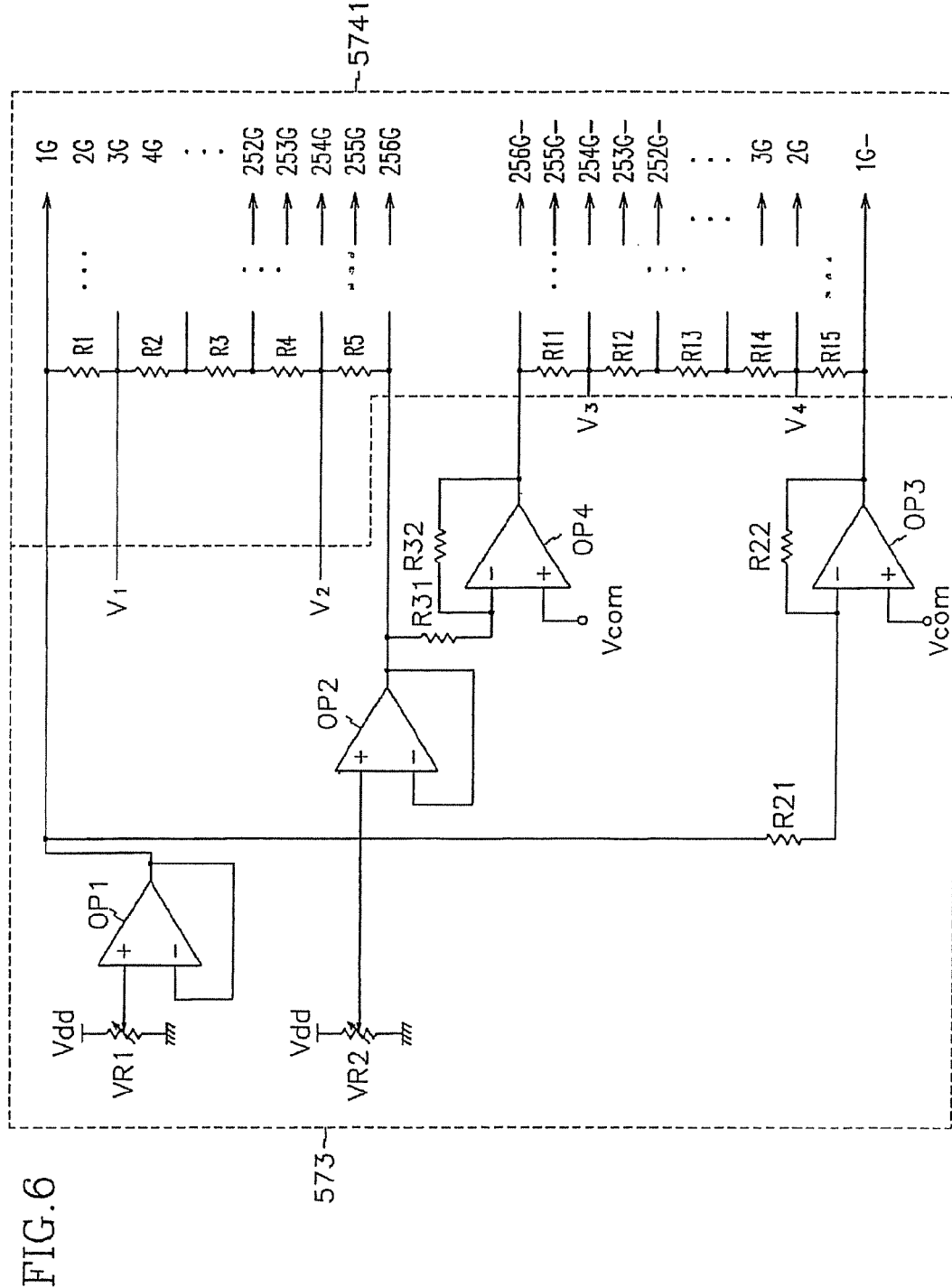
FIG. 6 is a detailed circuit diagram of a gray voltage generator according to still another embodiment of the present invention.

As shown in FIG. 6, a gray voltage generator 570 of the present embodiment includes a voltage regulator 573 and a voltage output unit 5741 connected thereto, like in FIG. 5. The voltage regulator 573 in FIG. 6 has the same configuration as the voltage regulator shown in FIG. 5.

The voltage output unit 5741 in FIG. 6 is different from the voltage output unit 574 in FIG. 5 in that voltages V1, V2, V3 and V4 having predetermined values are applied to nodes between resistors R1 an R2, between resistors R4 and R5, between resistors R11 and R12, and between resistors R14 and R15, respectively.

When values of the variable resistors VR1 and VR2 of the voltage regulator 573 are determined, and accordingly, values of output voltages of operational amplifiers OP1 and OP2 are determined, positive gray voltages across the resistors R1 and R5 at which the voltages V1 and V2 are respectively applied are determined under the influence of the output voltages of the operational amplifiers OP1 and OP2. However, voltages outputted within a range of application of the voltages V1 and V2 are outputted as a plurality of positive gray voltages resulting from a division of the predetermined voltages V1 and V2 by the resistors R2 to R4, regardless of the output voltages of the operational amplifiers OP1 and OP2.

In addition, like the positive gray voltages, in case of the negative gray voltages, the gray voltages influenced by output voltages of operational amplifiers OP3 and OP4 are voltages divided by the resistors R11 and R15 at which the voltages V3 and V4 are applied. However, the voltages divided by the resistors R12 to R14 are outputted as the negative gray voltages depending on the voltages V3 and V4 having predetermined values, under no influence of the is output voltages of the operational amplifiers V3 and V4.

As described above, the positive and negative gray voltages across the resistors R1, R5, R11 and R15 at which the voltages V1 to V4 are respectively applied are under the influence of the output voltages of the operational amplifiers OP1 to OP4 such that they are varied in connection with a variation of resistances of the variable resistors VR1 and VR2. On the contrary, the positive and negative gray voltages across the remaining resistors R2 to R3 and R12 to R14 are outputted as fixed values determined by the voltages V1 to V4 and resistances of the remaining resistors.

Although it is shown in FIG. 6 that the preset voltages V1 to V4 are applied to nodes between resistors R1 an R2, between resistors R4 and R5, between resistors R11 and R12, and between resistors R14 and R15, respectively, positions at which the voltages V1 to V4 are applied can be varied based on magnitudes of the output voltages of the operational amplifiers OP1 to OP4.

Figure 7:
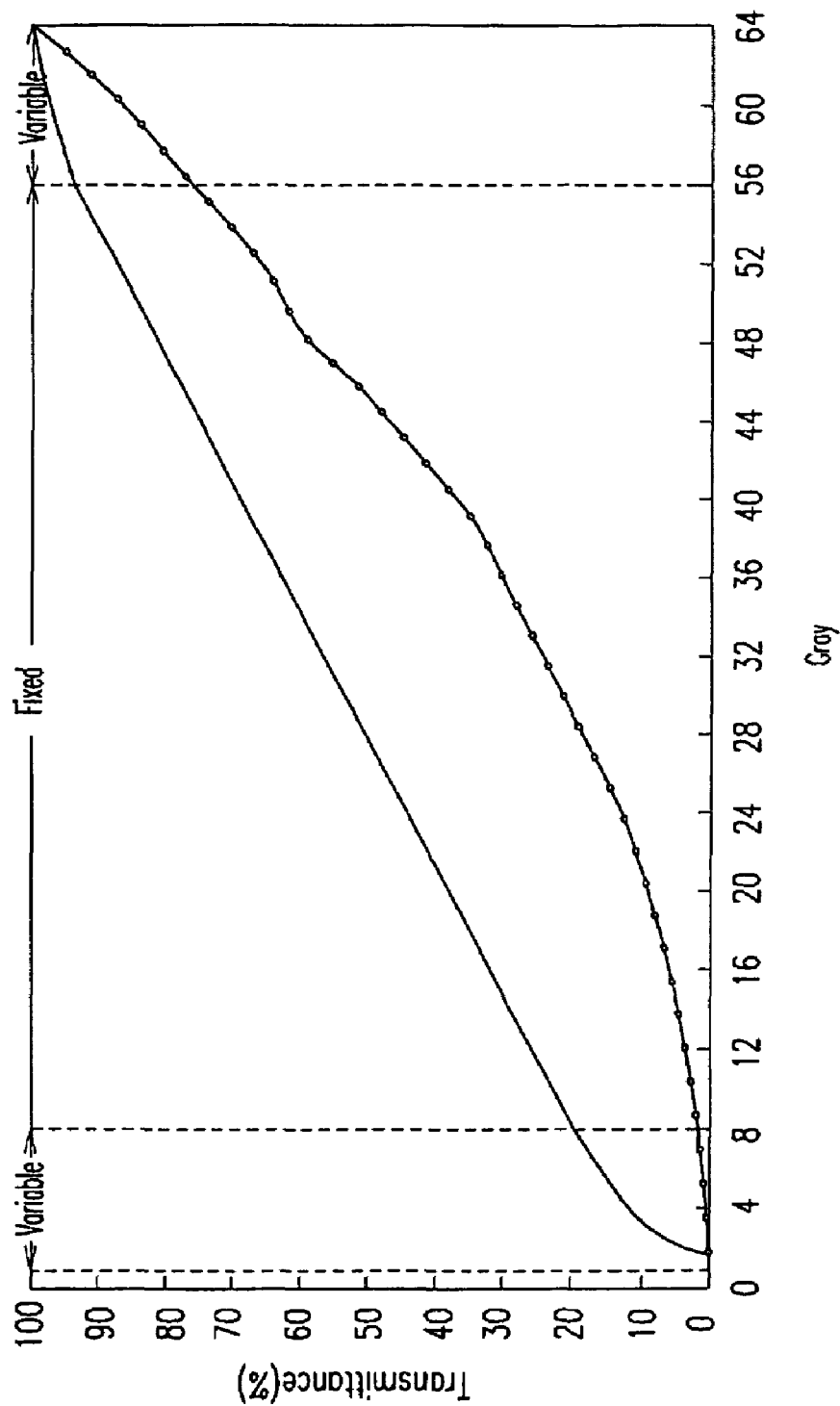
FIG. 7 is a graph showing a relationship between the gray and the transmittance which is obtained according to an embodiment of the present invention.

As described above, according to the embodiment of the present invention as shown in FIG. 7, the gray voltages can be changed up to arbitrary ranges near the black and white grays by adjusting the resistances of the variable resistors VR1 and VR2.

In addition, the voltage regulator 573 and the voltage output unit 5741 can be mounted on the PCB 500.

According to the embodiments of the present invention as described above, since the black and white voltages can be easily adjusted by adjusting the resistances of the variable resistors mounted on the liquid crystal panel assembly based on the gray characteristic of the LCD, the black and white characteristics for each LCD can be uniformly maintained.

Particularly, by separately adjusting voltages near the white voltages and the black voltages issued in the OCB mode and making no effect on other gray voltages, adjustment efficiency is improved.

What is claimed is:

1. A driving apparatus of a liquid crystal display including a plurality of pixels, the driving apparatus comprising:
   a gray voltage generator which generates a plurality of gray voltages;
   an image signal driver which selects gray voltages corresponding to color signals and which applies the selected gray voltages as image signal voltages to the pixels; and
   a signal controller which controls the image signal driver based on the color signals and input control signals which control the color signals,
   wherein at least two corresponding first gray voltages of the plurality of gray voltages have variable levels and more than two pairs of corresponding second gray voltages of the plurality of gray voltages have intermediate voltage levels in between each pair of the second gray voltages which are between the two corresponding first gray voltages and have levels which are fixed before and after a varying of the at least two corresponding first gray voltages.

2. The driving apparatus of claim 1, wherein the variable levels of the at least two corresponding first gray voltages are varied by using a variable resistor.

3. The driving apparatus of claim 1, wherein the at least two corresponding first gray voltages comprise one of a black voltage and a white voltage.

4. The driving apparatus of claim 1, wherein at least two corresponding third gray voltages of the plurality of gray voltages have variable levels.

5. The driving apparatus of claim 4, wherein the at least two corresponding first gray voltages include a black voltage, the at least two corresponding third gray voltages include a white voltage, and the variable levels of the at least two corresponding first gray voltages and the variable levels of the at least two corresponding third gray voltages are varied independently.

6. The driving apparatus of claim 1, wherein the plurality of gray voltages includes a plurality of pairs of gray voltages, each individual gray voltage of a respective pair of gray voltages of the plurality of pairs of gray voltages having opposite polarities and equal magnitudes.

7. The driving apparatus of claim 6, wherein individual gray voltages of at least one pair of gray voltages of the plurality of pairs of gray voltages each have variable levels.

8. The driving apparatus of claim 2, wherein the variable resistor and the signal controller are mounted on a printed circuit board external to the liquid crystal display.

9. A driving apparatus for a liquid crystal display including a plurality of pixels, the driving apparatus comprising:
   a gray voltage generator which generates gray voltages;
   a data driver which selects the gray voltages corresponding to color signals and which applies the selected gray voltages as image signal voltages to pixels of the plurality of pixels; and
   a signal controller which controls the data driver based on the color signals and input control signals which control the color signals,
   wherein the gray voltage generator comprises:
   a first variable resistor unit connected to the data driver and which provides a first variable gray voltage;
   a first array of resistors connected between the first variable resistor unit and a first voltage node and which generates a plurality of first gray voltages to be provided to the data driver;
   a second array of resistors having a terminal connected to the first voltage node and which generates a plurality of second gray voltages which are fixed before and after a varying of the first and second variable gray voltage; and
   a polarity inverter connected to the data driver for inverting a polarity of a signal from the first variable resistor unit and which provides the polarity-inverted signal to the data driver,
   wherein a first predetermined voltage is applied to the first voltage node, and
   a voltage level of the plurality of second gray voltages is different than voltage levels of both the first variable gray voltage and the plurality of first gray voltages, wherein the gray voltage generator further comprises a second variable resistor unit connected to the data driver and which provides a second variable gray voltage to the data driver, and wherein the gray voltage generator further comprises a third array of resistors connected between the second variable resistor unit and a second voltage node and which generates a plurality of third gray voltages to be provided to the data driver, wherein a second predetermined voltage is applied to the second voltage node.

10. The driving apparatus of claim 9, wherein the first variable resistor unit comprises a variable resistor and a buffer connected between a variable terminal of the variable resistor and an input terminal of the polarity inverter for outputting the first variable gray voltage to the polarity inverter.

11. The driving apparatus of claim 10, wherein the polarity inverter comprises an operational amplifier having an inverting terminal connected to the buffer, a non-inverting terminal supplied with an inverting reference voltage, and an output terminal, a first resistor connected between the buffer and the inverting terminal, and a second resistor connected between the inverting terminal and the output terminal.

12. The driving apparatus claim 9, wherein the second array of resistors is connected between the first voltage node and the second voltage node.

13. The driving apparatus claim 9, wherein the first variable gray voltage includes a black voltage and the second variable gray voltage includes a white voltage.

14. The driving apparatus of claim 9, wherein the polarity inverter and the data driver are provided on a chip.

15. The driving apparatus of claim 2, wherein the variable resistor and the signal controller are provided on a chip.

16. The driving apparatus of claim 1, wherein the liquid crystal display has an optically compensated bend (OCB) mode.

17. A driving apparatus for a liquid crystal display including a plurality of pixels, the driving apparatus comprising:
   a gray voltage generator for generating a plurality of gray voltages;
   a data driver for selecting gray voltages corresponding to color signals and for applying the selected gray voltages as image signal voltages to the pixels; and
   a signal controller for controlling the data driver based on the color signals and input control signals for controlling the color signals, wherein the gray voltage generator comprises a first voltage output unit and a second voltage output unit, wherein a pair of corresponding black gray voltages and a pair of corresponding white gray voltages generated in the first voltage output unit have variable levels and more than two pairs of corresponding gray voltages generated in the second voltage output unit have intermediate voltage levels in between each pair of the second gray voltages which are between the black gray voltage and the white gray voltage and have levels which are fixed before and after a varying of the black gray voltage and the white gray voltage generated in the first voltage output unit.

18. The driving apparatus of claim 17, wherein the variable levels of a black gray voltage and a white gray voltage are varied by using a variable resistor.

19. The driving apparatus of claim 18, wherein the variable levels of the black voltage and the variable levels of the white voltage are varied independently.

20. The driving apparatus of claim 17, wherein the second voltage output unit includes an array of resistors connected between a supply voltage and the common voltage.

21. The driving apparatus of claim 17, wherein the fixed levels of a plurality of gray voltages are the levels of the gray voltage between the black gray voltage and the white gray voltage are varied by using a variable resistor.

22. The driving apparatus of claim 17, wherein the plurality of gray voltages includes a plurality of pairs of gray voltages, each individual gray voltage of a respective pair of gray voltages of the plurality of pairs of gray voltages having opposite polarities and equal magnitudes.

23. The driving apparatus of claim 22, wherein individual gray voltages of at least one pair of gray voltages of the plurality of pairs of gray voltages are each have variable levels.

* * * * *